(12) United States Patent
Arav

(10) Patent No.: US 11,998,003 B2
(45) Date of Patent: Jun. 4, 2024

(54) DEVICES AND METHODS FOR PREPARATION OF A BIOLOGICAL SAMPLE FOR A CRYOPROCEDURE

(71) Applicant: FertileSafe Ltd, Ness Tziona (IL)

(72) Inventor: Amir Arav, Ness Tziona (IL)

(73) Assignee: FERTILESAFE LTD., Ness Tziona (IL)

( * ) Notice: Subject to any disclaimer, the term of this patent is extended or adjusted under 35 U.S.C. 154(b) by 692 days.

(21) Appl. No.: 15/761,073

(22) PCT Filed: Oct. 13, 2016

(86) PCT No.: PCT/IL2016/051115
§ 371 (c)(1),
(2) Date: Mar. 16, 2018

(87) PCT Pub. No.: WO2017/064715
PCT Pub. Date: Apr. 20, 2017

(65) Prior Publication Data
US 2018/0255765 A1     Sep. 13, 2018

Related U.S. Application Data

(60) Provisional application No. 62/358,045, filed on Jul. 3, 2016, provisional application No. 62/240,646, filed on Oct. 13, 2015.

(51) Int. Cl.
*A01N 1/02*     (2006.01)

(52) U.S. Cl.
CPC .......... *A01N 1/0268* (2013.01); *A01N 1/0257* (2013.01)

(58) Field of Classification Search
None
See application file for complete search history.

(56) References Cited

U.S. PATENT DOCUMENTS 3,995,496 A * 12/1976 Bickford ................. B01L 3/021
                                                                 73/864.03
5,217,693 A    6/1993 Anderson et al.
(Continued)

FOREIGN PATENT DOCUMENTS

CA     2897219 A1    7/2014
CN    101779623      2/2012
(Continued)

OTHER PUBLICATIONS

PCT Search Report for PCT Application PCT/IL2017/05044 dated May 21, 2017.
(Continued)

*Primary Examiner* — William H. Beisner
(74) *Attorney, Agent, or Firm* — The Roy Gross Law Firm, LLC; Roy Gross

(57) ABSTRACT

The present invention discloses devices configured to perform a cryoprocedure on at least one biological sample and methods for using the devices. The disclosed devices comprise a straw and a pod. The straw comprises a straw space, configured to draw liquid from a distal end of the straw space towards a proximal end of the straw space. The pod is coupled to a distal end of the straw and comprises a perforated member comprises at least one orifice whose diameter is smaller than the diameter of the at least one biological sample, wherein the perforated element is configured to allow inflow of liquids into the preparation space and outflow of liquids from the preparation space. The holding space is configured to form, together with the straw space, a preparation space wherein the at least one biological sample can undergo the cryoprocedure.

9 Claims, 13 Drawing Sheets

(56) References Cited

U.S. PATENT DOCUMENTS

| | | | |
|---|---|---|---|
| 6,117,394 A * | 9/2000 | Smith | B01L 3/0275 |
| | | | 422/513 |
| 2004/0177390 A1 | 9/2004 | Lewis et al. | |
| 2006/0046243 A1 | 3/2006 | Stachecki et al. | |
| 2011/0207112 A1 | 8/2011 | Burbank et al. | |
| 2013/0137080 A1 | 5/2013 | Henderson et al. | |
| 2013/0260452 A1 | 10/2013 | Toner et al. | |
| 2014/0158695 A1 * | 6/2014 | Jimenez-Rios | G01N 1/28 |
| | | | 220/560.04 |
| 2014/0342454 A1 * | 11/2014 | Burbank | C12M 45/00 |
| | | | 435/374 |
| 2015/0011000 A1 | 1/2015 | Stojanov | |
| 2015/0313211 A1 * | 11/2015 | Ng | A01N 1/0268 |
| | | | 435/374 |
| 2016/0029619 A1 | 2/2016 | Sun et al. | |

FOREIGN PATENT DOCUMENTS

| | | |
|---|---|---|
| EP | 2706342 | 3/2014 |
| WO | WO 99/09137 A1 | 2/1999 |
| WO | WO 99/011121 | 11/1999 |
| WO | WO 01/78504 A2 | 10/2001 |
| WO | WO 2008/011070 A2 | 1/2008 |
| WO | WO 2013/098825 | 7/2013 |
| WO | WO 2014/088514 | 6/2014 |
| WO | WO 2014/106286 | 7/2014 |
| WO | WO 2014/186531 | 11/2014 |
| WO | WO/2014/088514 | 12/2014 |
| WO | WO 2015/191570 | 12/2015 |
| WO | WO 2016/087873 A2 | 6/2016 |
| WO | WO 2017/122210 | 7/2017 |

OTHER PUBLICATIONS

PCT Search Report for PCT Application PCT/IL/2016/051115 dated Apr. 26, 2018.
PCT Search Report for PCT Application PCT/IB2017/000465 dated Feb. 14, 2019.
"Vitrification of human ICSI/IVF spermatozoa without cryoprotectants: new capillary technology." Journal of andrology 33.3 Isachenko, V., et al. Dec. 31, 2012 (Dec. 31, 2012).

* cited by examiner

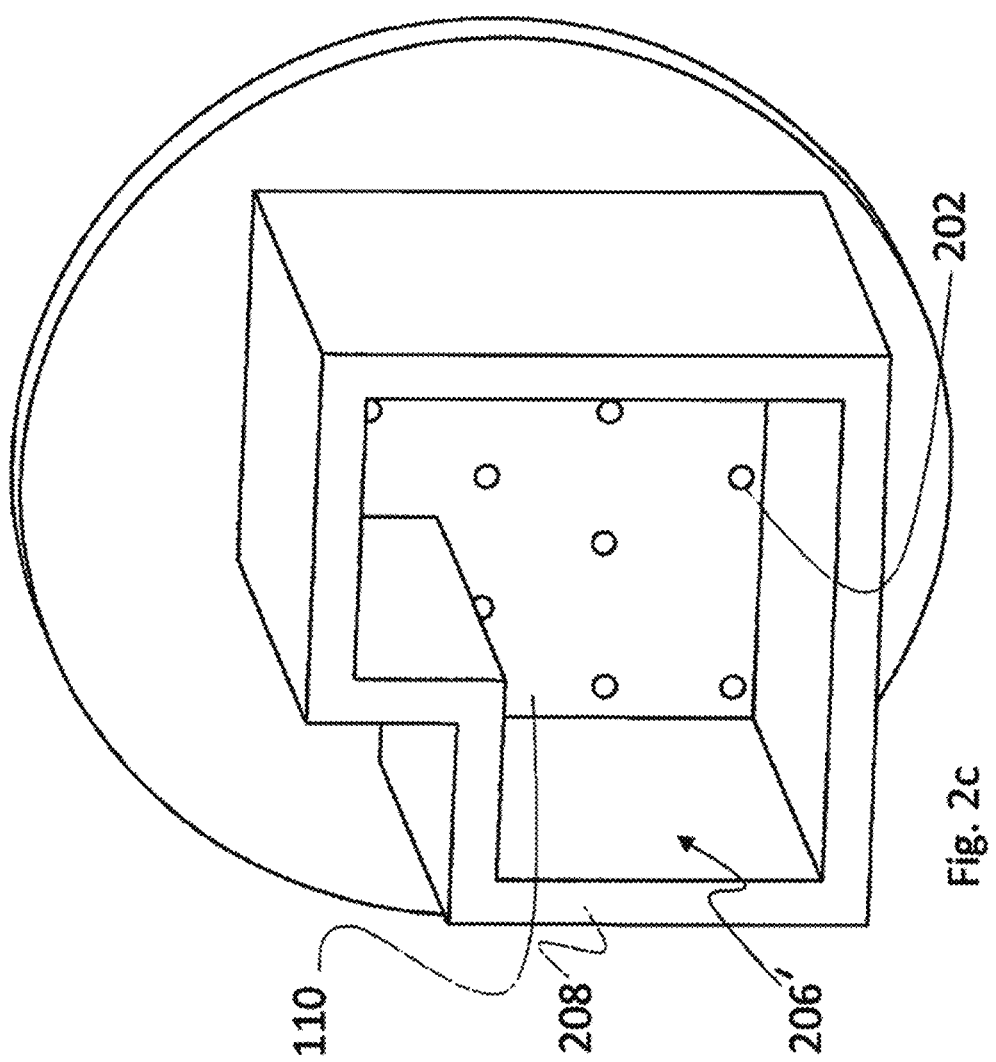

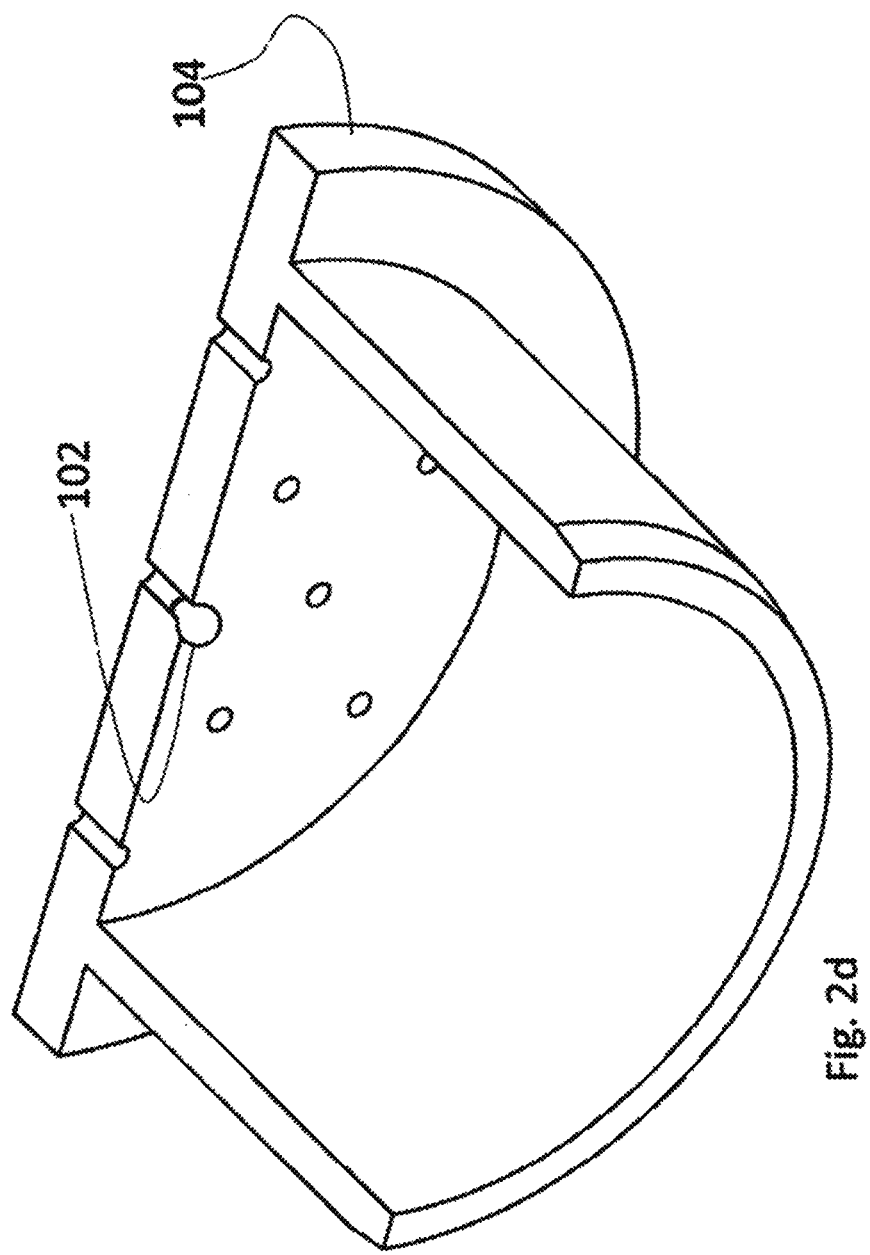

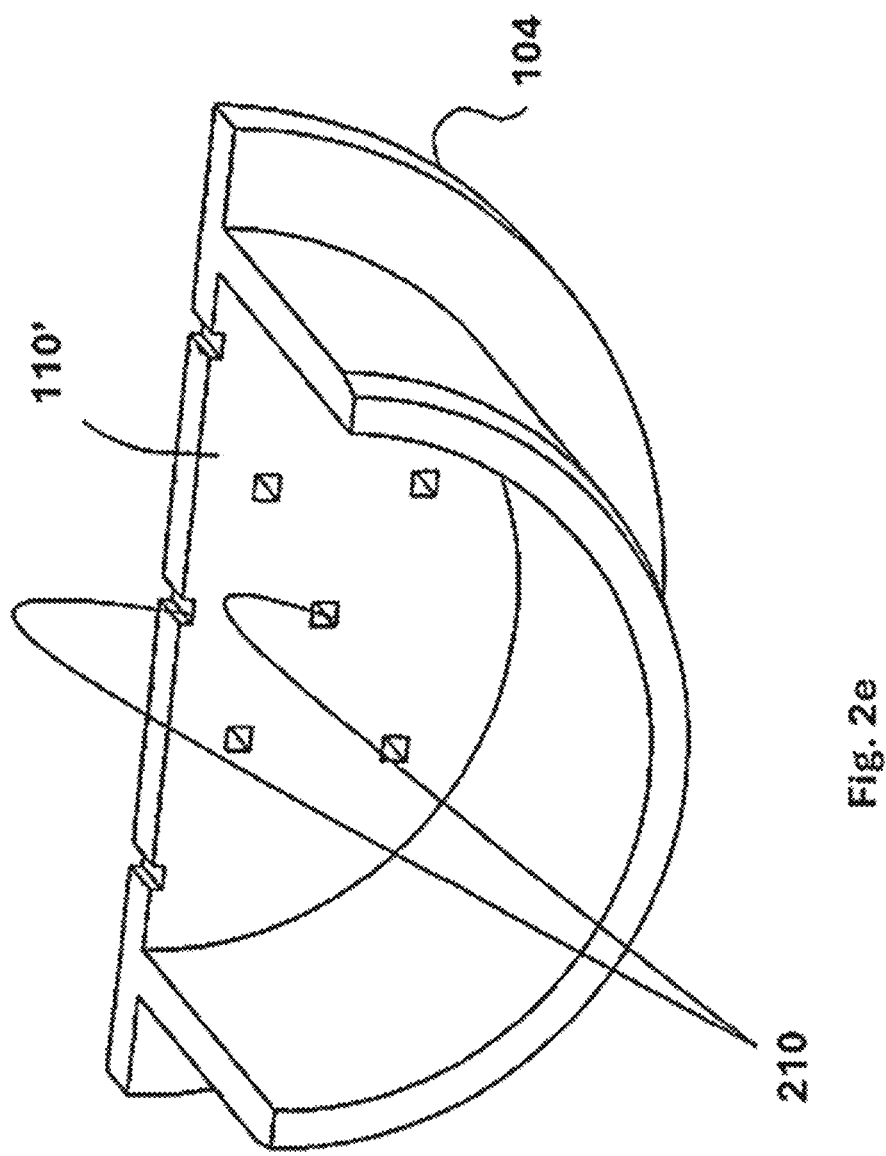

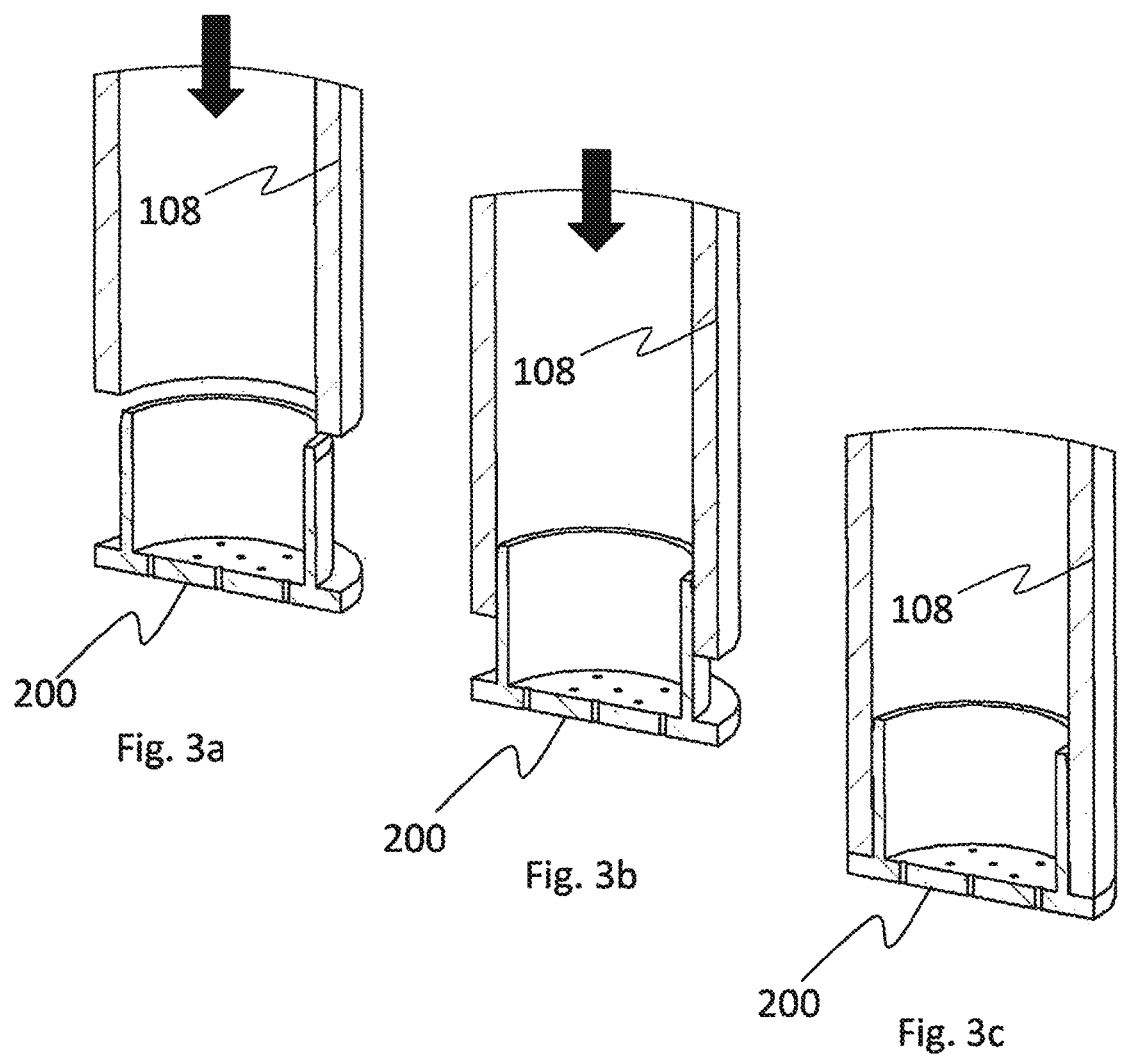

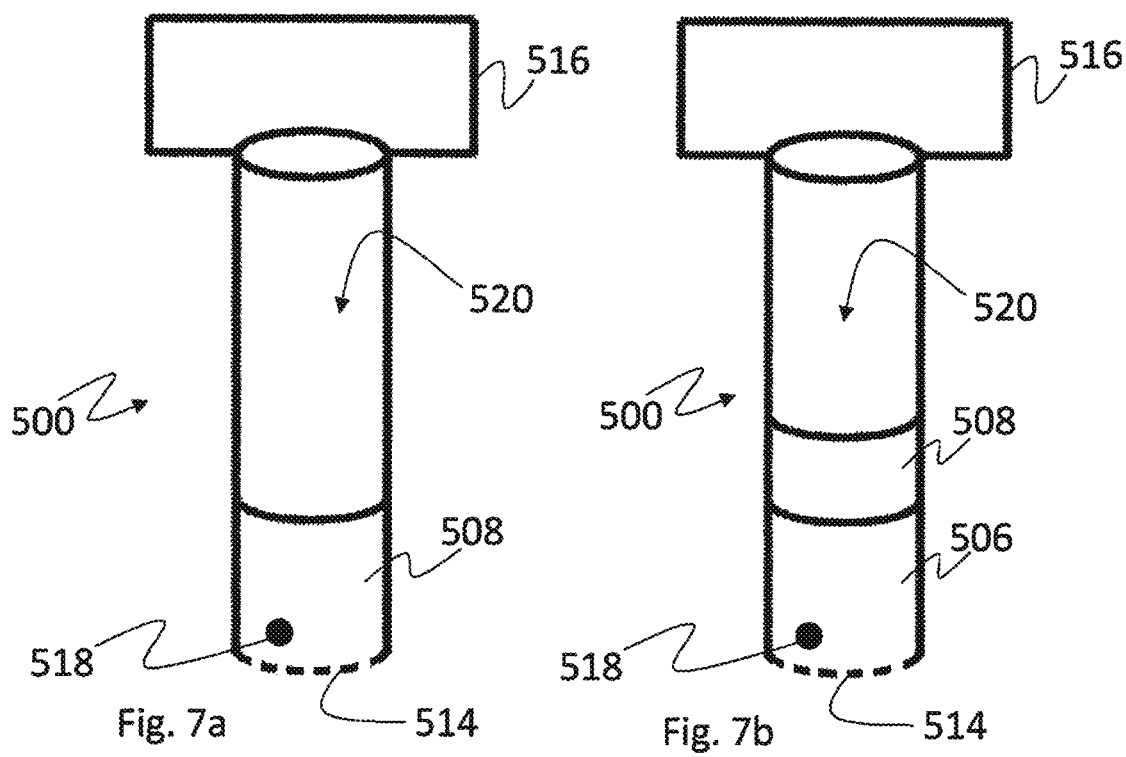
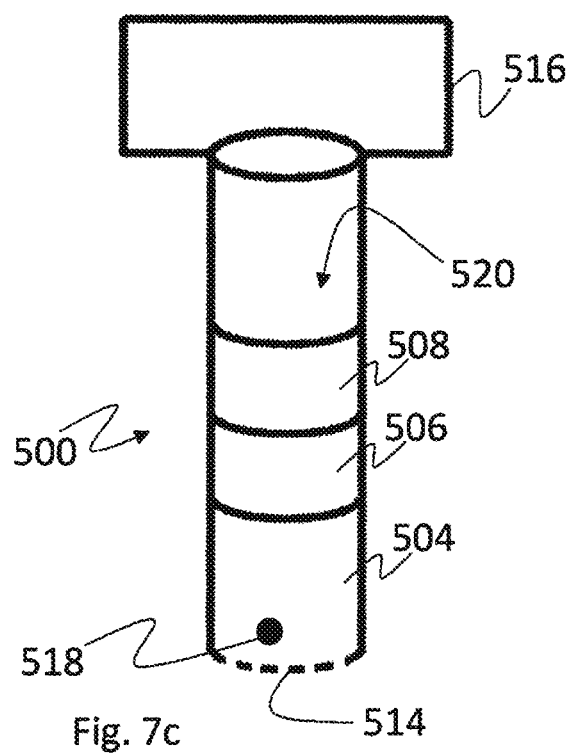

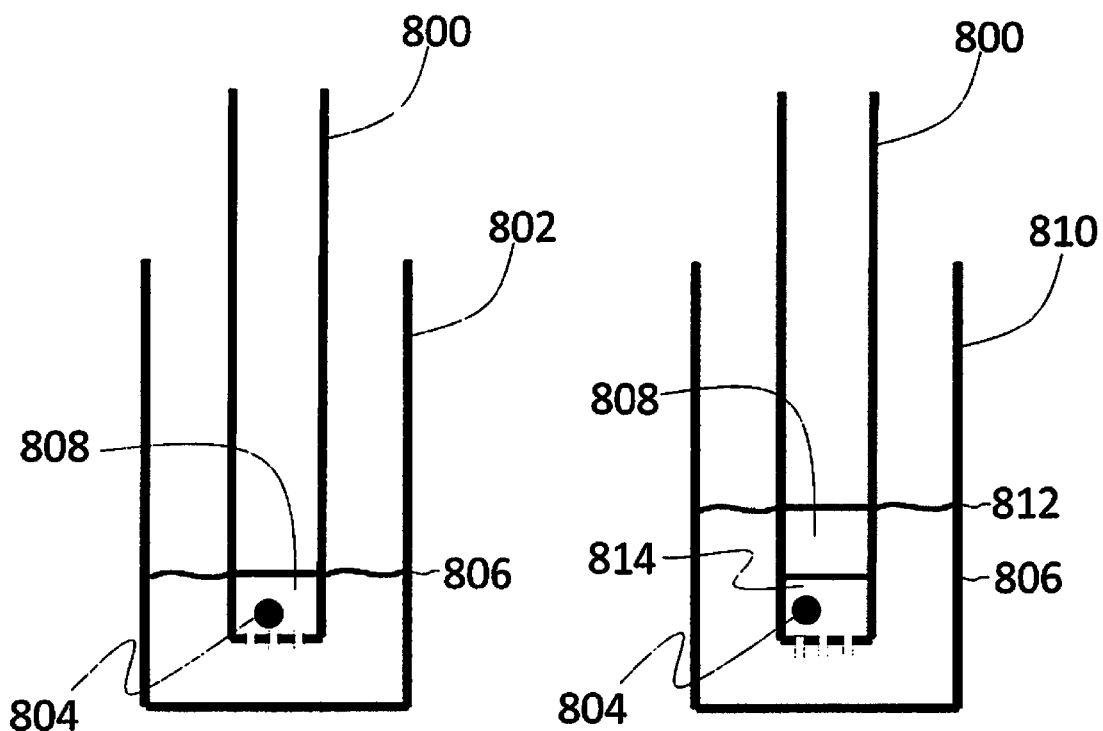
Fig. 8a
Fig. 8b
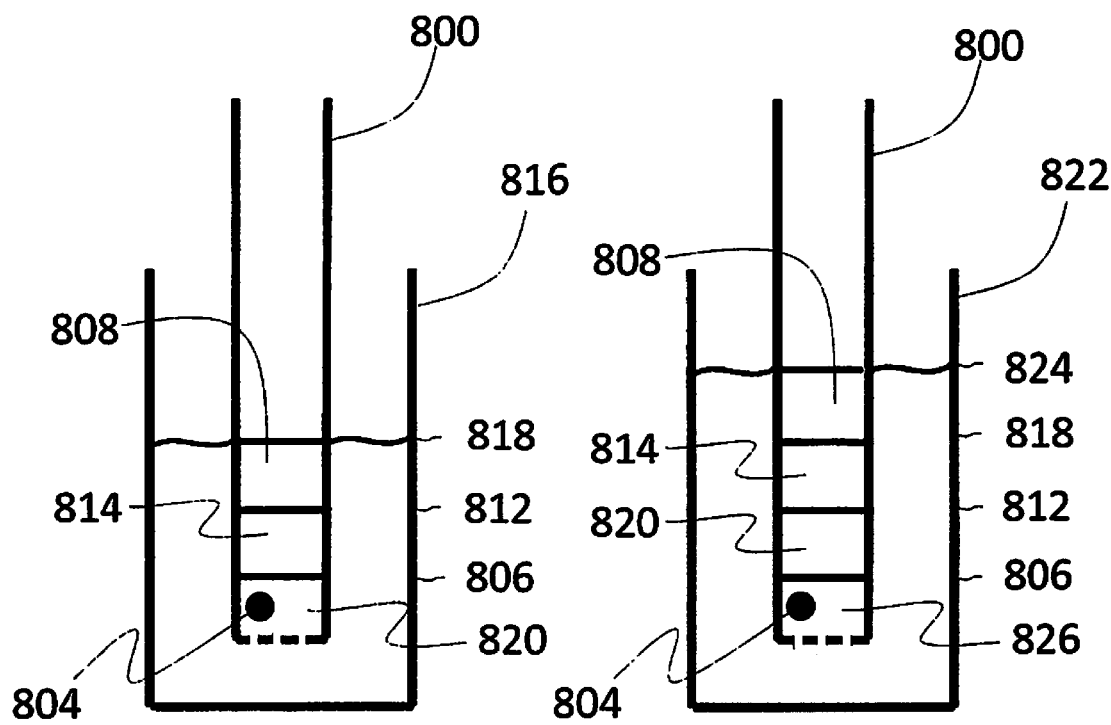
Fig. 8c
Fig. 8d

DEVICES AND METHODS FOR PREPARATION OF A BIOLOGICAL SAMPLE FOR A CRYOPROCEDURE

This application is a 371 of PCT/IL2016/051115, filed Oct. 13, 2016, which claims priority from provisional application Ser. No. 62/240,646, filed Oct. 13, 2015, and from provisional application Ser. No. 62/358,045, filed Jul. 3, 2016. The entire contents of each of these applications are incorporated herein by reference.

BACKGROUND

Technical Field

This application generally relates to devices for micromanipulation of biological samples, more specifically to vitrification, culturing, cryopreservation, thawing and/or warming of biological samples and methods for using the devices.

Background of the Invention

Preservation of biological samples, for example oocytes and embryos at very low temperature is known as cryopreservation. One of the major challenges of cryopreservation is to prevent the intracellular liquid within the sample from turning into ice crystals. Two common techniques of cryopreservation are slow freezing and vitrification.

During the slow freezing process ice crystals are formed intercellularly, and as a result the remaining liquid becomes hypertonic thus allowing intracellular water to leave the cells and to pass towards an outside of the cells by exosmosis, thus preventing intracellular crystallization.

In vitrification, intercellular and intracellular water crystallization is avoided by means of a very high cooling rate. According to some vitrification protocols, the sample is plunged into a very cold cryogenic medium, e.g., liquid nitrogen (LN) or LN slush), thus resulting in very high cooling rates, which enables vitrification rather than crystallization of the intracellular and intercellular liquids.

In some protocols, vitrification may be further enabled by increasing the viscosity of the sample, for example by applying various cryoprotectants and/or other applicable additives, by reducing the volume of the sample, or by a combination thereof. For example, the publication "Vitrification of oocytes and embryos" (Amir Arav, "Embryonic development and manipulation in animal development", edited by A. Lauria and F. Gandolfi, Portland Press, London, U.K., 1992), presents a method of vitrifying cells enclosed in small drops sufficient to keep them in physiological conditions. In this publication, Arav reports that with volume of 70 nanoliter drops, good survival rates can be achieved even with low concentration of cryoprotectant.

Vitrification is further described in the following publications:

"Titration of Vitrification Solution in Mouse Embryo Cryopreservation" (A. ARAV, L. GIANAROLI. AND P. SURIANO, Cryobiology 25(6), 1988) presents reducing the toxicity of the vitrification solution by decreasing the time and temperature of embryo exposure to cryoprotectant solution.

"Osmotic and cytotoxic study of vitrification of immature bovine oocytes" (A. Arav, D. Shehu, and M. Mattioli, Journal of Reproduction and Fertility, 99: 353-358, 1993) presents experiments conducted in order to determine the composition of a solution suitable for vitrification of immature bovine oocytes.

"New trends in gamete's cryopreservation" (Amir Arav, Saar Yavin, Yoel Zeron, Dity Natan, Izik Dekel, and Haim Gacitua. Molecular and Cellular Endocrinology, 187: 77-81, 2002) presents techniques to improve freezing and vitrification of sperm, oocytes and embryos, based on 'Multi-Thermal-Gradient' (MTG) freezing.

"Measurement of essential physical properties of vitrification solutions" (S. Yavin and A. Arav. Theriogenology, 67(1): 81-9, 2007) examines the principal parameters associated with successful vitrification, and composes guidelines to aspects of the vitrification process.

"Embryo cryopreservation in the presence of low concentration of vitrification solution with sealed pulled straws in liquid nitrogen slush" (Saar Yavin, Adaya Aroyo, Zvi Roth, and Amir Arav. Human Reproduction, 24(4): 797-804, 2009) presents a vitrification method that combines LN slush and sealed pulled straws (SPS).

U.S. Patent Application 2011/0207112 (Burbank and Jones, published in 2011) discloses an automated system and method of cryopreservation and reanimation of oocytes, embryos, or blastocysts. One or more oocytes or embryos are positioned in a processing container, the processing container being configured to allow fluid to flow into and out of the processing container, where two or more fluids flow into and out of the processing container with oocytes or embryos therein.

PCT publication WO/2014/088514 (NG and Vajta, published in 2014) relates to a method of producing at least one vitrified cell comprising loading a cell into a holding space in at least one conduit; providing at least one cryoprotectant to the holding space of the conduit in increasing concentrations, wherein the cryoprotectant is capable of equilibrating the cell; cooling the cell in the holding space of the conduit to produce a vitrified cell; and storing and maintaining the vitrified cell in the holding space of the conduit.

SUMMARY OF THE INVENTION

According to some embodiment of the invention, there are disclosed devices configured to perform a cryoprocedure on at least one biological sample, the device comprising:
 a straw comprising a straw space, configured to draw liquid from a distal end of the straw space towards a proximal end of the straw space; and
 a pod coupled to a distal end of the straw, the pod comprising
  a perforated member comprising at least one orifice whose diameter is smaller than the diameter of the at least one biological sample, wherein the perforated element is configured to allow inflow of liquids into the preparation space and outflow of liquids from the preparation space; and
  a holding space configured to form, together with the straw space, a preparation space wherein the at least one biological sample can undergo the cryoprocedure.

In some cases, the at least one orifice has a circular cross section.

In some cases, the at least one orifice has a square cross section.

In some cases, the device further comprising:
 A pump coupled to a proximal end of the straw.

In some cases, the straw is a capillary duct and the straw space is a capillary space. Several embodiments of the invention disclose a pod coupleable to a straw that is configured for performing a cryoprocedure on at least one biological sample, the pod comprising:
  a holding space configured to form, upon coupling with the straw, a preparation space together with a straw space;
  a perforated member comprising at least one orifice whose diameter is smaller than the diameter of the at least one biological sample, wherein the perforated element is configured to allow inflow of liquids used for the cryoprocedure into the holding space and outflow of liquids from the holding space.

In some cases, the at least one orifice has a circular cross section.

In some cases, the at least one orifice has a square cross section.

According to embodiments of the invention there are provided methods for performing a cryoprocedure on at least one biological sample in a straw, comprising:
  loading the at least one biological sample into a straw;
  exposing the at least one sample in the straw to solutions with gradually changing densities, while preventing the at least one sample from flowing out of the straw.

In some cases, the loading the at least one biological sample is performed by capillary action.

In other cases, the loading the at least one biological sample is performed by pumping-in the at least one sample.

In yet other cases the loading of the at least one biological sample is performed by utilizing the communicating vessels concept.

Moreover, in some cases the exposing is performed by replacing solutions in the straw. In some cases, the exposing is performed by capillary action.

While in yet other cases the exposing is performed by loading layers of gradually changing solutions into the straw.

Furthermore, in some cases the loading layers is performed in accordance with the communicating vessels concept.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 2C illustrates a pod comprising a circumferential wall with a polygonal cross section, according to embodiments of the invention;

FIG. 2D schematically illustrates a biological sample in a longitudinal cut of an orifice, in embodiments of the invention;

FIG. 2E schematically illustrates an alternative pod, according to embodiments of the invention;

FIGS. 3A, 3B and 3C illustrate coupling of pod 200 with capillary duct 108, according to embodiments of the invention;

FIGS. 7A, 7B and 7C illustrate stages of loading the straw of FIG. 5, according to embodiments of the invention; and FIG. 8 illustrates loading four solutions into a straw, according to embodiments of the invention.

DETAILED DESCRIPTION

Figure 1:
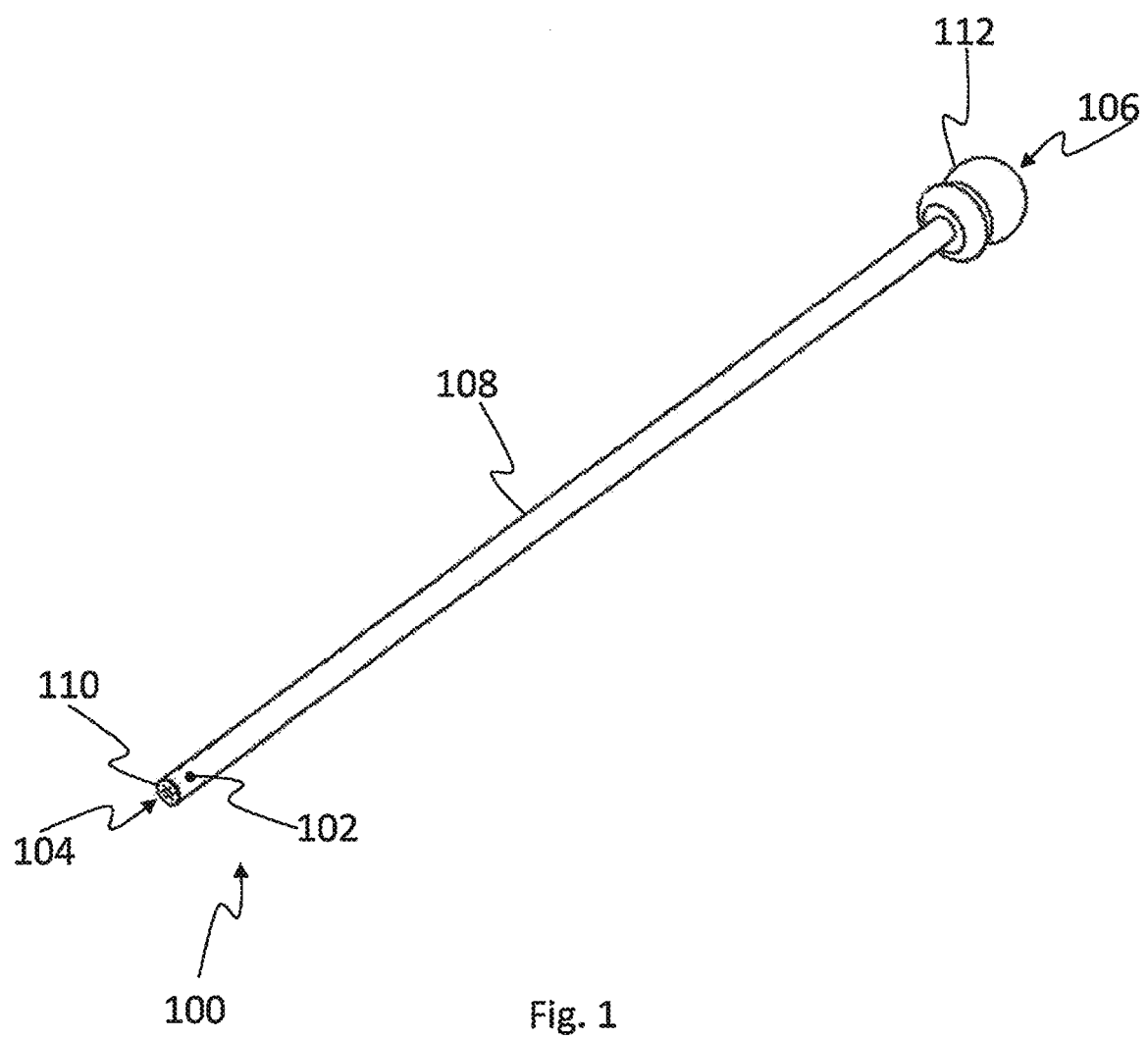
FIG. 1 is a schematic presentation of a capillary device configured to apply cryoprocedures to a biological sample.

In the following description components that are common to more than one figure may be referenced by the same reference numerals.

In addition, unless specifically noted otherwise, embodiments described or referenced in the present description can be additional and/or alternative to any other embodiment described or referenced therein.

Herein there are disclosed embodiments of the invention that are configured to vitrify at least one biological sample, i.e., either a single sample or multiple samples. However, due to simplicity considerations and in order to make the description more readable, the description refers to "a sample". It should be understood, that unless specifically noted otherwise, whenever "a sample" is mentioned, the same should apply also to "at least one sample". Similarly, whenever reference is made to "the sample", the same should apply to "the at least one sample" as well.

FIG. 1 is a schematic presentation of a capillary device 100 configured to apply cryoprocedures to a biological sample 102. Capillary device 100 may comprise transparent, translucent and/or opaque members. Accordingly, biological sample 102 that resides inside the capillary device may be unseen from the outside, though in the figure, in order to explain the invention, the biological sample appears as if the device is transparent.

The presently illustrated device has a capillary duct 108 with two ends. In order to distinguish between the ends they are designated as a distal end 104 and a proximal end 106. In the distal end the device comprises a perforated element 110. In the proximal end the device is illustrated with a manual pump 112. It is noted that the existence of manual pump 112 is non-mandatory and in some embodiments it is missing. Moreover, while the pump in the figure is a manual pump, this is non-mandatory as well and in other embodiments another pump may be used, such as an electrical pump, or even a different kind of a manual pump. Inside the capillary device there is a free space 114, constituting "capillary space". Similar to the capillary duct, the capillary space also has a distal end (at the capillary duct's distal end) and a proximal end (at the capillary duct's proximal end).

Cryoprocedures, with reference to some embodiments described herein, comprise culturing, vitrification, cryopreservation, thawing and/or warming, etc. In some embodiments a cryoprocedure may be any one of culturing, vitrification, freezing, lyophilization, cryopreservation, thawing and/or warming. In some embodiments cryoprocedures may comprise vitrification and cryopreservation, with or without culturing. In some embodiments cryoprocedures may comprise cryopreservation and thawing or cryopreservation and warming. In some embodiments cryoprocedures may comprise vitrification, cryopreservation and thawing or vitrification, cryopreservation and warming. In some embodiments, though, cryoprocedures may comprise culturing, vitrification, cryopreservation and thawing or culturing, vitrification, cryopreservation and warming. Herein, the description refers to vitrification as an example. However, it should be appreciated that unless specifically noted, other cryoprocedures can be referred to hereinafter, wherein a cryoprocedure can be, e.g., any one of the cryoprocedures mentioned above.

The biological sample 102, shortly referred to as "sample", may be of an animal origin, including but not restricted to human beings, mammals, and vertebrates. In some cases, the biological sample may be a single cell sample, such as an oocyte or sperms, while in other cases, the biological sample may be a multi-cell suspension. In yet other cases, the biological sample may be a tissue, for example a piece of tissue, such as a slice of ovarian tissue or a slice of testicular tissue, an embryo, or others. In some cases, the invention is used for handling reproductive biological samples (such as oocytes and/or sperm and/or embryos and/or ovarian tissues and/or testicular tissue etc.). However, the invention is not limited to reproductive biological samples and embodiments thereof may be directed to other kinds of biological samples. One non limiting example for using the invention with other (non-reproductive) kinds of biological samples is preparing a piece of tissue taken in a biopsy for cryopreservation, before the piece can be sent for analysis.

According to embodiments of the invention, the biological sample can be loaded into the capillary space of the capillary duct using different methods. It is well known that capillarity (known also as capillary action or capillary motion) gives rise to the ability of a liquid to flow in narrow spaces without the assistance of, or even in opposition to, external forces such as gravity. Accordingly, the mass of the biological sample affects the ability to load it into the capillary duct by capillary action. For small biological samples the loading of the cells may take place via capillary action. For larger biological samples, loading may take place using a pump such as pump 112 in order to pump-in the sample. If applicable to the case, a pump can be used also for loading small biological samples. It is known per se that the determination of a sample being small or large so as to allow or prevent its capillary loading is effected, e.g., by the radius of the capillary space, the mass of the liquid and the mass of the sample.

Figure 2A:
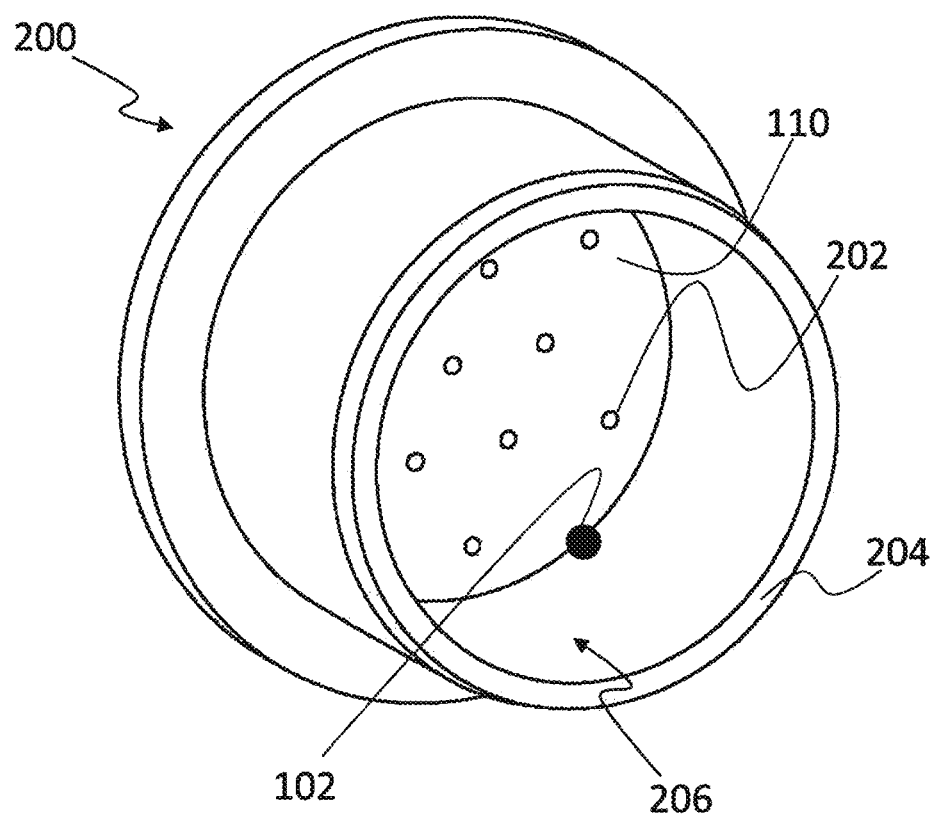
FIG. 2A presents a pod, according to embodiments of the invention.
Figure 2B:
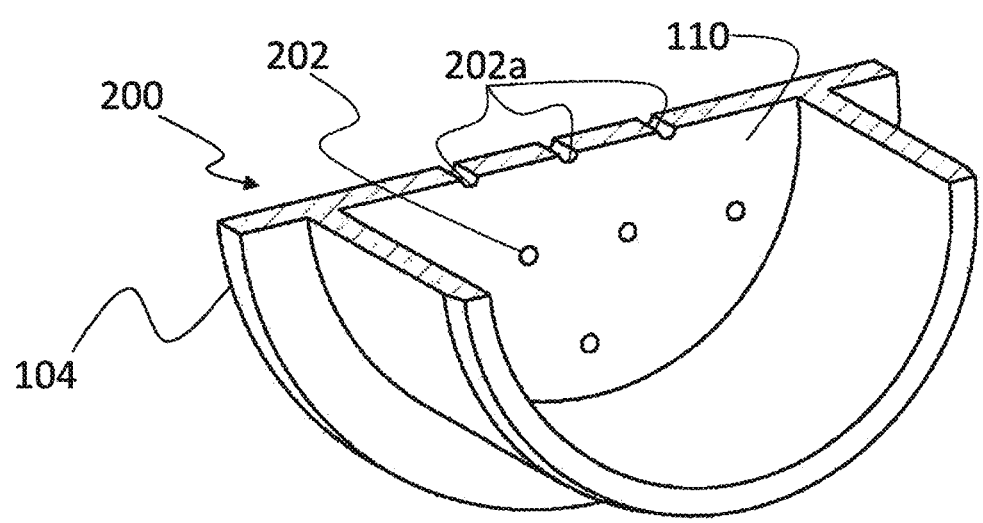
FIG. 2B presents a cut of FIG. 2A, according to embodiments of the invention.

FIG. 2A and FIG. 2B present a device referred to as a pod 200, according to embodiments of the invention. While in FIG. 2A the whole pod is presented, FIG. 2B presents a cut in pod 200, illustrated in order to demonstrate features of the embodiment. Pod 200 comprises a perforated element 110. The perforated element comprises at least one orifice 202 whose diameter is small enough to prevent the biological sample from flowing therethrough, i.e., at least one orifice whose diameter is smaller than the diameter of the biological sample. It should be understood that a biological sample flowing through an orifice actually outflows from the pod, and in most cases this means that the sample is lost. In different embodiments the diameter of an orifice 202 should not exceed 5 µm (micrometer) or 10 µm or 15 µm or 20 µm or 25 µm or 40 µm or 50 µm or 55 µm or 60 µm or 65 µm or 70 µm or 75 µm or 80 µm or 85 µm or 90 µm or 95 µm or 100 µm or 120 µm or 140 µm or 150 µm or 160 µm or 180 µm or 200 µm or 250 µm or 300 µm or 350 µm or 400 µm or 450 µm or 500 µm or another diameter configured to be smaller than the diameter of the biological sample.

It is noted that "at least one orifice" covers the case wherein the perforated member comprises a single orifice, as well as those cases when the perforated member comprises multiple orifices.

Pod 200 comprises a circumferential wall 204, delineating a holding space 206 in the pod, in which a biological sample 102 may reside. The illustrated embodiments of pod 200 have a circular cross section and circumferential wall 204 also has a circular cross section. However, this is not limiting and circumferential wall may have a different shape such as a polygonal cross section of circumferential wall 208, as illustrated in FIG. 2C. Circumferential wall 208 could have been drawn as a rectangular circumferential wall, square circumferential wall, pentagonal circumferential wall or any other basic/classic cross section of circumferential wall in order to illustrate that the cross section of the pod's circumferential wall may be of any shape applicable to the case. There may exist pods comprising any one of the aforementioned cross sections and others, if applicable.

A cut in perforated element 110 is illustrated in FIG. 2B, wherein the cut exposes longitudinal cuts 202a in three orifices 202. The longitudinal cuts illustrate that orifices 202 actually cross perforated element 110, thereby allowing passage across the perforated member to particles whose diameter is smaller than the diameter of the perforations.

Furthermore, FIGS. 2A, 2B and 2C illustrate orifices 202 with circular cross section. This is non-mandatory as well and other forms of orifices may be used if applicable. For example, it should be appreciated that under certain conditions, such as negative pressure, biological samples 102, such as oocytes, may be pulled, inside holding space 206, towards perforated elements 202. Under such conditions the biological sample may tend to penetrate the orifices, e.g., as illustrated in FIG. 2D. One object of the invention is to improve sample recovery rates further to thawing or warming the sample after cryopreservation, while such penetration of the sample into an orifice deteriorates its survival and recovery rates. Therefore, according alternative embodiments of the invention, such as the alternative pods of FIG. 2E, orifices having a square cross section are used, thus reducing the tendency of the biological sample to penetrate into the orifice.

Figure 2F:
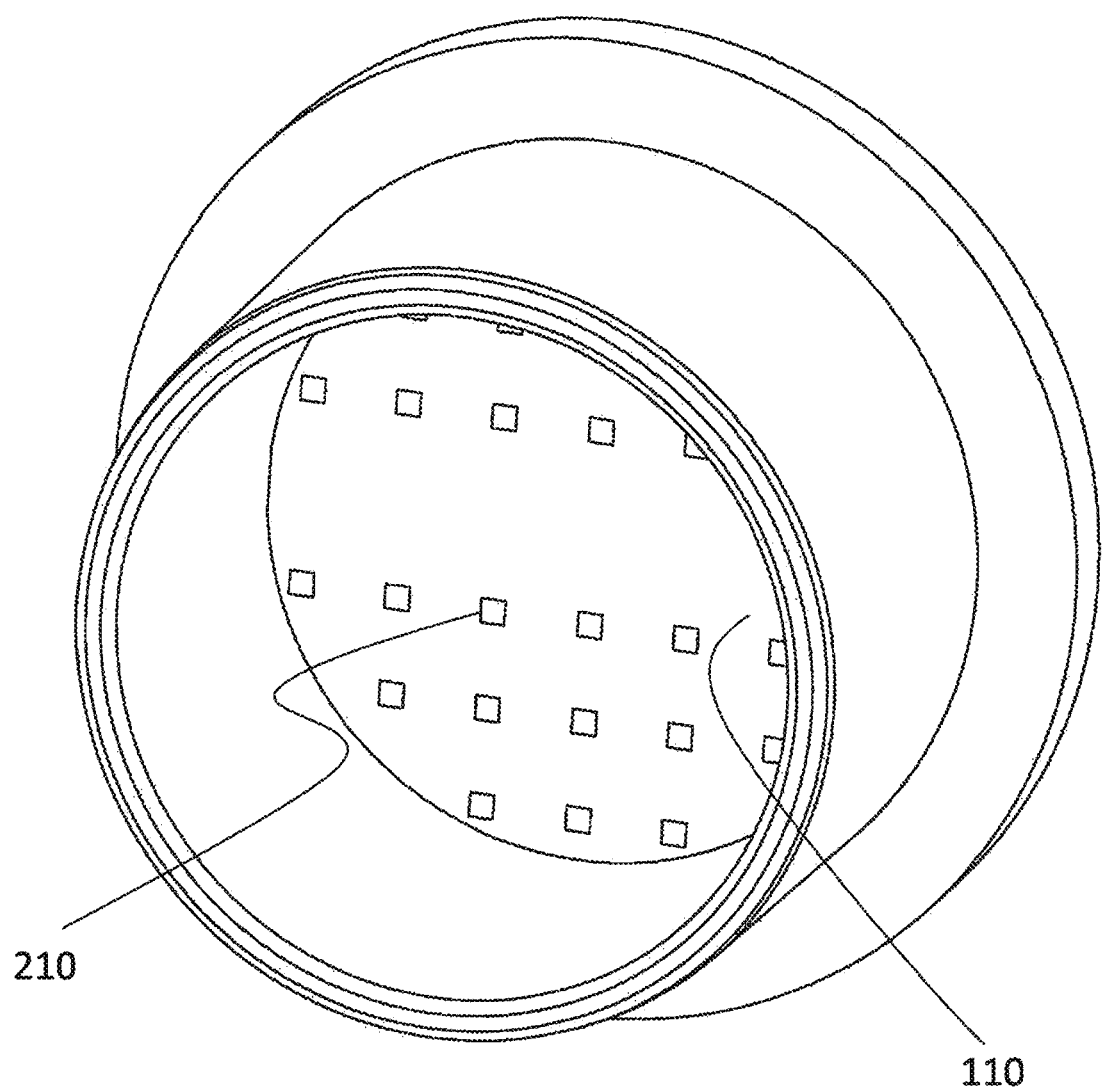
FIG. 2F is an image of a perforated element, according to embodiments of the invention.

FIG. 2F is an image of a perforated element, according to embodiments of the invention, wherein a perforated element 110 with square orifices 210 can be seen.

Prior to advancing with the description it should be considered that the forms of orifices described thus far (round and square) are non-limiting and other orifices, having different forms and shapes may exist. For example, an orifice may be a slit through which capillary flow may appear.

Figure 2G:
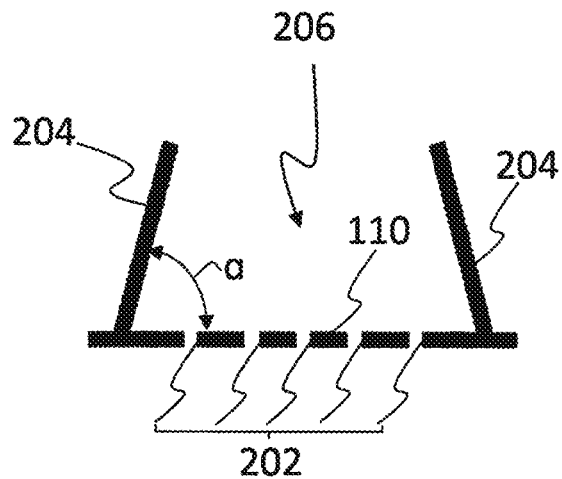
FIGS. 2G, 2H, 2I, 2J and 2K schematically illustrate two-dimensional representations of pods, according to embodiments of the invention.
Figure 2H:
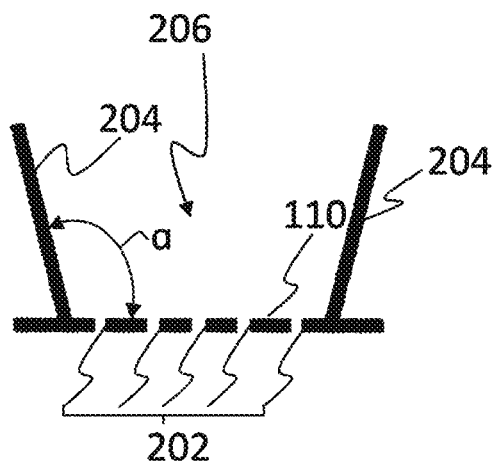
Figure 2I:
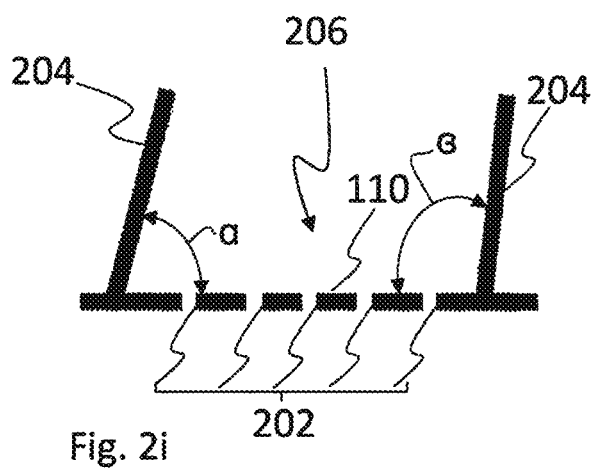

So far, in the embodiments depicted by FIGS. 2A to 2F, the circumferential walls of the pods were substantially perpendicular to the perforated element, meaning that the two surfaces (the perforated element and the walls) meet at a substantially right angle (90 degrees), with allowed deviation of 1, 2 or 3 degrees, e.g., due to minor shape distortions. It is noted that substantial perpendicularity is non-limiting as well and in other embodiments the perforated element and the walls may meet at an angle wider or narrower than 90 degrees. Moreover, the angle may change along the walls. The meeting angle α of the perforated element and the walls is measured inside the pod's holding space and is marked as angle α. In those cases when the angle changes along the lines there would be at least one position along the walls wherein the meeting angle, marked as β, would present β≠α. Accordingly, FIGS. 2G, 2H and 2I schematically illustrate two-dimensional representations of pods, according to embodiments of the invention, where in FIG. 2G α<90 degrees, in FIG. 2H α>90 degrees and in FIG. 2I α≠β.

Measuring the meeting angles α and β inside the pod's holding space is a matter of convention and in some embodiments the angles are measured externally to the holding space.

Figure 2J:
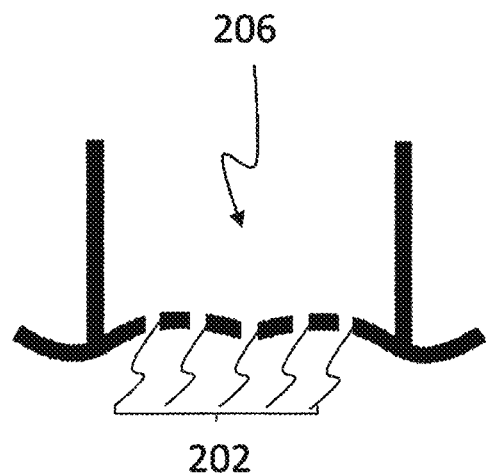
Figure 2K:
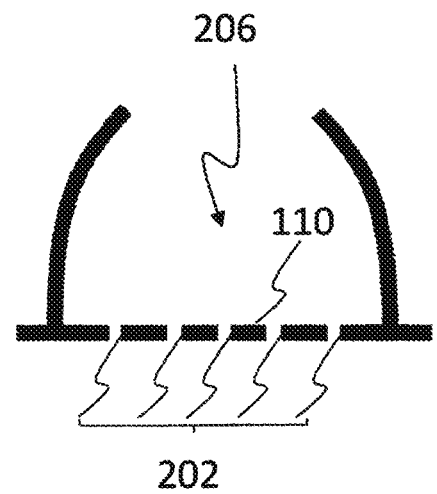

It is possible to select any point along the upper rim of the circumferential wall and draw on the wall the shortest line from the selected point to the perforated element. Such a line constitutes a "height". In the embodiments described so far with reference to FIGS. 2A to 2I, the heights were straight lines. It should be appreciated that in some embodiments, e.g., as illustrated in FIG. 2J, the perforated element may form a non-planar base. Similarly, the walls may be bent unlike being straight, for example as shown in FIG. 2K, wherein the walls bend towards the center.

It should be appreciated that combinations of the aforementioned embodiments exist as well, if applicable. For example, the circular walls of FIG. 2A can be combined with the square orifices of FIG. 2E and/or the non-planar perforated element of FIG. 2J. Any other combination may apply as well, including a circumferential wall having different shapes for its side facing the holding space and the outer side.

Further to being introduced to several pods, it should be appreciated that generally, a pod comprises a vessel and a holding space. The vessel, according to some embodiments, comprises the circumferential wall and the perforated element. The vessel comprises at least one opening at its proximal end and a plurality of orifices on its distal end.

A pod can be coupled to a capillary duct, such as duct 108 of FIG. 1. The capillary duct and the pod are structurally couplable. For example, FIGS. 3A to 3C illustrate coupling of pod 200 with capillary duct 108, according to embodiments of the invention. An open distal end of the capillary duct approaches the circumferential wall 204 of pod 200. In order to couple the pod with the capillary duct, the external form of circumferential wall 204 should adapt to the internal form of the capillary duct at and close to the duct's distal opening, similar to the adaptation of a key to a keyhole. In FIG. 3B the capillary duct further approaches the circumferential wall and in FIG. 3C coupling is achieved when the pod locks the capillary duct and/or vice versa (i.e., the capillary duct locks the pod). Further to the coupling, the holding space of the pod and the capillary space of the capillary duct may form together a preparation space in which a liquid column may be formed. Moreover, in some embodiments the pod can be manufactured with the capillary duct, as a single unit, wherein the sample may be loaded into the preparation space, e.g., from the proximal end of the capillary duct/space.

Further to explaining how a preparation space is formed, it is noted that alternative ways may exist, according to the invention. For example, instead of coupling the capillary duct to the pod by pressure, they can be coupled, e.g., by screwing. According to another alternative, they can be coupled by pressure while the capillary duct fits into the pod, instead of fitting the pod into the capillary duct, as illustrated, e.g., in FIGS. 3A to 3C. Any other alternative applicable to the case may be used here, as long as the result is a preparation space obtained by coupling a pod with a perforated element to a capillary duct.

In those cases wherein the pod fits into the capillary duct or the capillary duct fits into the pod, it should be appreciated that there is an element that hus hugged element. When the pod fits into the capillary duct it is the duct that hugs the pod while the pod is being hugged by the duct. When the capillary duct fits into the pod the pod is the hugging element while the duct is the hugged element. It is known that in low temperature different materials display different degrees of shrinkage. Therefore, in order to prevent disintegration of the duct-pod connection in low temperature, the hugging element needs to be made of material with higher shrinking coefficient compared to the hugged element. For example, if the capillary duct is the hugging element which is manufactured of poly propylene, the pod can be made of poly carbonate.

Further to being introduced to some devices according to the invention, attention is drawn now to methods for using the device for cryopreservation of a biological sample. It should be appreciated that due to capillarity, when the distal end of the capillary duct (such as 104 in FIG. 1) is immersed in a liquid, the capillary space will draw the liquid up, giving rise to a liquid column. Herein the term "immersing" means bringing the distal end in touch with a liquid, so as to allow capillary action to build a liquid column in the capillary duct. On the other hand, it is also possible to drain liquids from within the capillary space of the capillary duct. Draining can be done, e.g., by bringing the distal end in touch with a material having adhesion which is strong enough to overcome the adhesion forces operating in the capillary space to hold the liquid column. For example, it is possible to drain the liquid with a blotting paper or even with an absorbent cottonwool or cotton. Alternatively, instead of draining the capillary duct with an absorbent material, it is possible to push the liquid out of the capillary duct by using, for example, a pump coupled to the duct's proximal end.

Figure 4:
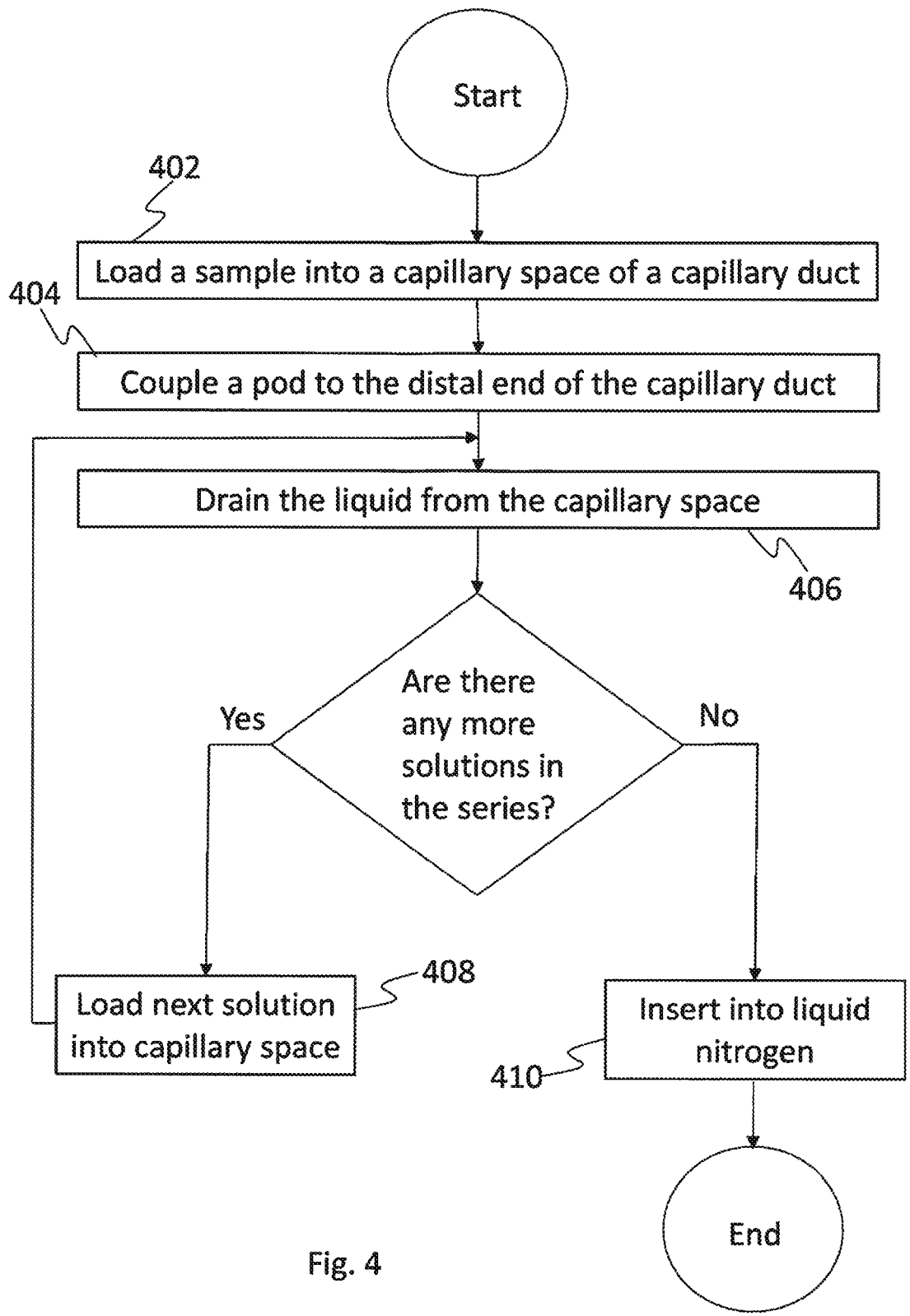
FIG. 4 is a flowchart illustrating procedures taken in order to prepare a sample for vitrification, according to embodiments of the invention.

It has been explained above that the biological sample can be loaded into the capillary duct, for example, by capillary action. In addition, it is known in the art that the process of vitrification involves changes of solutions in which the sample should be submerged. Having said all that, FIG. 4 presents a flowchart illustrating procedures taken in order to prepare a sample for vitrification, according to embodiments of the invention.

In 402 a sample is loaded to a capillary space (e.g., 114) of a capillary duct (e.g. 108). As was previously explained, loading can be done, for example, by capillary action or by using a pump. It should be noted that immediately further to loading, the sample resides inside the capillary space, submerged in a liquid that is similar to the liquid in which it was submerged prior to loading. Hence, for example, had the sample been stored in a holding medium prior to loading, then immediately after loading there would be a sample submerged in the holding medium inside the capillary space.

In 404 a pod is coupled to the distal end of the capillary duct. Coupling is performed by any way applicable to the case, such as by applying pressure (see FIGS. 3A to 3C), by screwing etc. The perforated member of the pod would prevent the sample from unintentionally running out of the capillary space via the distal end of the capillary duct.

It should be appreciated by those versed in the art of vitrification that in order to prepare a biological sample for vitrification the sample needs to be submerged in a series of solutions that gradually replace the water that naturally reside in the sample with cryoprotectants. In the example of vitrification these are known per se holding medium (HM), equilibration solutions (ES) and vitrification solution (VS). Holding medium can be buffer solution supplement with proteins, equilibration solution could be 7.5V/V Dimethyl sulfoxide (DMSO), 7.5% V/V Ethylene glycol (EG) and 20% fetal calf serum (FCS) in buffer solution. Vitrification solution can be 15% V/V DMSO, 15% V/V EG, 0.5M sucrose and 20% fetal calf serum (FCS) in buffer solution. Accordingly, for each solution in the series, in 406 the liquid within the capillary space is drained, e.g. by touching with the distal end on a blotting paper, filter paper, absorbent cottonwool or cotton etc., as was previously explained, and in 408 the next solution in the series is loaded into the capillary space by immersing the distal end therein. After the last solution is drained in 406 the capillary duct can be inserted in 410 into, e.g., liquid nitrogen, liquid nitrogen slush or liquid air for cryopreservation.

Therefore, embodiments of the invention disclose a device (such as device 100) that is configured to treat the biological sample with a series of solutions. The series may comprise any applicable number (n) of solutions, such that n=1, n=2, n=3, n=4, n=5, 5=6, n=7, n=8, n=9, n=10, or any other applicable number of solutions as appropriate to the case.

In addition, it should be understood that the flowchart of FIG. 4 is disclosed by way of example only, and other embodiments may exist. For example, device 100 of FIG. 1, with any applicable pod (see, e.g., FIGS. 2A to 2K) is configured to be used for preparation of a biological sample for cryopreservation as well as for cryopreservation itself, as it can be inserted into liquid nitrogen. However, alternative methods to those presented in FIG. 4 may skip 410 ("insert into liquid nitrogen"). Instead of cryopreserving the sample while inside the device, it is possible to extract it from the capillary space, transfer it to another container or tool for insertion into liquid nitrogen.

Further to understanding the embodiments described so far, it can be appreciated that solutions can be loaded into the capillary space by additional or alternative ways to capillarity action. For example, according to some embodiments it is possible to connect a pump to the proximal end of the capillary duct, thus pumping the solution into the capillary duct instead of letting it flow in by capillary action alone. Moreover, understanding that the solution (or generally, the liquid) flows into the capillary duct by the force affected by the pump, it can be appreciated that in some embodiments the capillary duct must not be capillary anymore. That is, embodiments of the invention comprise a "straw", or a "tube", wherein a "capillary duct" is a private case of a straw. Similarly, a "straw space" is the space inside the straw, while "capillary space" is a private case of a straw space that exhibits capillarity.

It is noted that all the embodiments previously presented with reference to devices comprising a capillary duct apply also to devices comprising a straw. This includes also the embodiments of the pods. Accordingly, the embodiments presented with reference to FIGS. 1, 2A to 2K and 3A to 3C should apply also to a non-capillary straw, mutatis mutandis.

Figure 5:
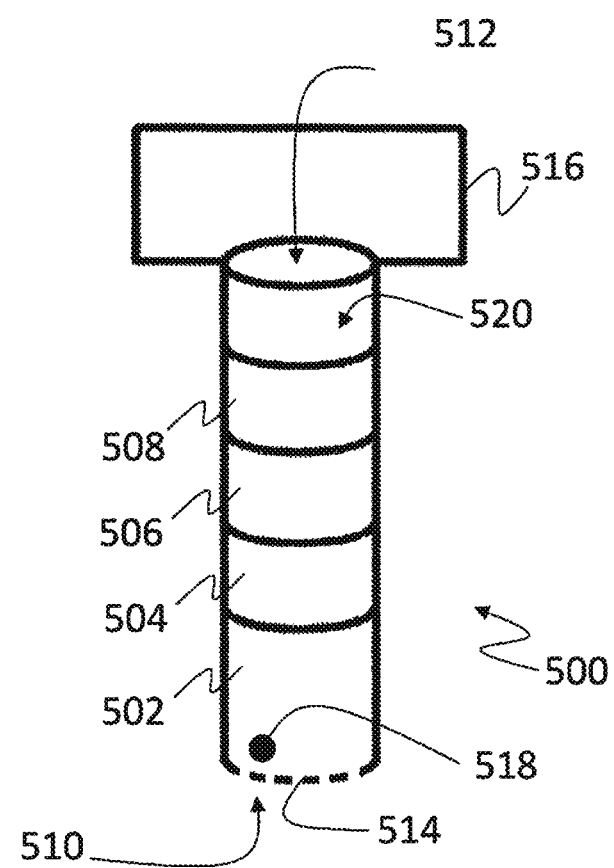
FIG. 5 illustrates a straw having four different layers of liquid therein, according to embodiments of the invention.

When a pump is coupled to a straw in order to draw liquid into the straw space, according to embodiments alternative to the method of FIG. 4, it may not be required to drain the liquid from the straw space prior to loading the next liquid thereto. In those cases that the second liquid (for example, equilibration solutions) has a density that is higher than the density of the first liquid (for example, holding medium), the third (such as vitrification solution) has higher density compared to the second and so forth (series has higher density compared to its preceding density, in other words, it is heavier), it may be understood that having a layer of a solution above a layer of previous solution in the straw space would not result in mixing thereof, at least not without investment of additional energy, such as by mixing. FIG. 5 illustrates a straw 500 having four different layers therein, marked as 502, 504, 506 and 508. The straw distal end is marked 510 and the proximal end is 512. In the distal end there is a perforated member 514 that can be, for example, the perforated member of any one of the pods describes with reference to FIGS. 2A to 2K. Straw 500 can be capillary or not, as applicable to the case. It can be appreciated that layer 502 is of the heaviest solution (in terms of density), 504 is lighter, 506 is even lighter, and the lightest is 508, 516 represents a pump, coupled to the straw at its proximal end 512, 518 represents a biological sample and 520 represents the straw space.

Figure 6:
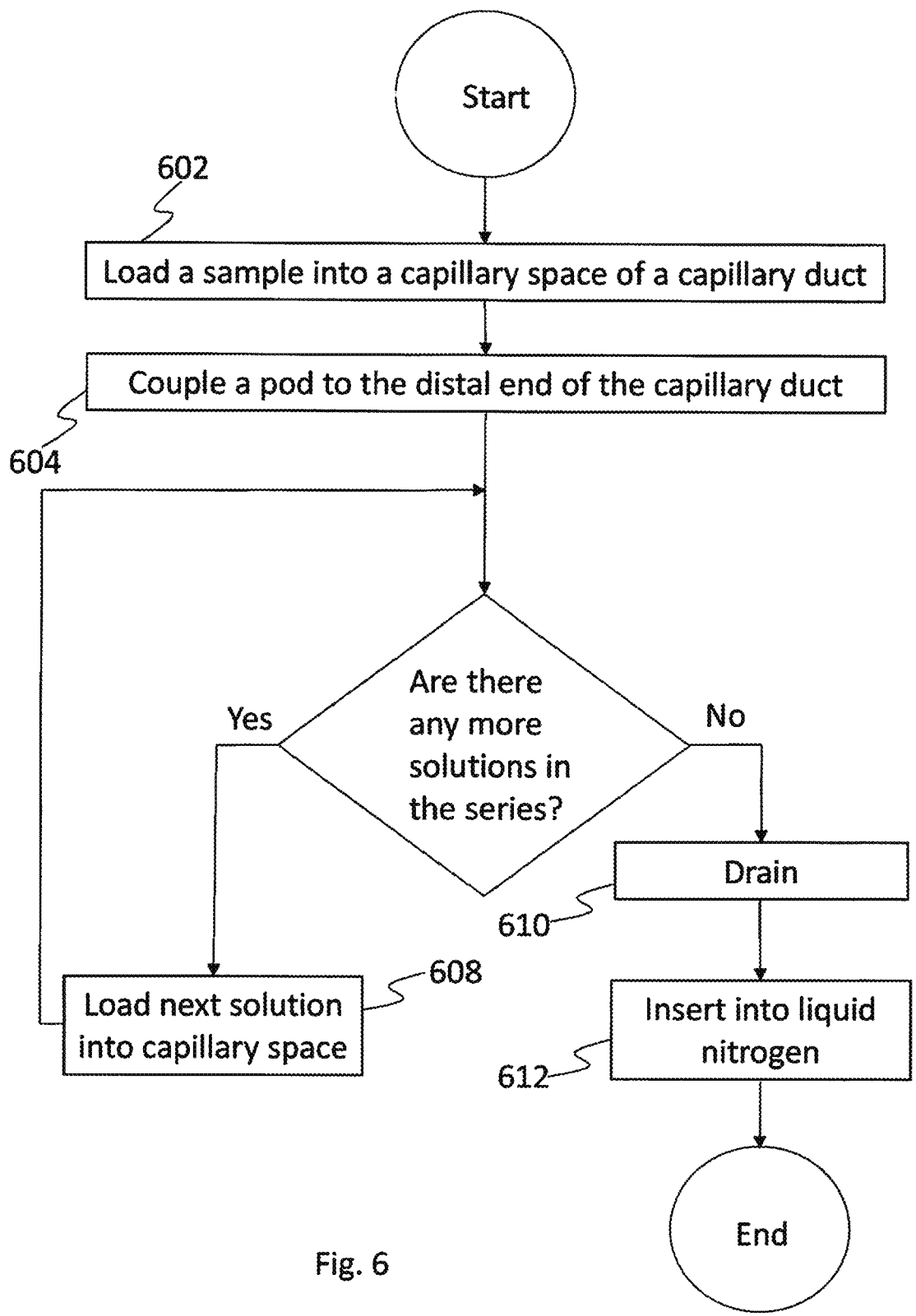
FIG. 6 is a flowchart illustrating procedures taken in order to prepare a sample for vitrification, according to embodiments of the invention.

FIG. 6 is a flowchart illustrating procedures taken in order to prepare a sample for vitrification, according to embodiments of the invention. Basically, FIG. 6 resembles FIG. 4, though no draining is performed among the loadings of the different solutions. In 602 a sample (such as 102 or 518) is loaded to a straw space (e.g., 114 or 520) of an empty straw (e.g. 108 or 500). As was previously explained, loading can be done, for example, by capillary action in a capillary duct or by using a pump (such as 112 or 516). It should be noted that immediately further to loading, the sample resides inside the straw space, submerged in a liquid that is similar to the liquid in which it was submerged prior to loading. Hence, for example, had the sample been stored in a holding medium prior to loading, then immediately after loading there would be a sample submerged in the holding medium inside the straw.

In 604 a pod is coupled to the distal end of the capillary duct. Coupling is performed by any way applicable to the case, such as by applying pressure (sec FIGS. 3A to 3C), by screwing etc. The perforated member of the pod would prevent the sample from unintentional running out of the capillary space via the distal end of the capillary duct.

It has been noted before that those versed in the art of vitrification would appreciate that in order to prepare a biological sample for vitrification the sample needs to be submerged in a series of solutions while the densities of the solutions increase as the preparation advances, because the concentration of ctyoprotectants increases. Accordingly, for each solution in the series, in 608 the next solution in the series is loaded into the capillary space by immersing the distal end therein and operating the pump. Finally, all the layers are drained in 610 and the straw can be inserted in 612 into liquid nitrogen for cryopreservation.

FIGS. 7A, 7B and 7C illustrate stages of loading the straw of FIG. 5, according to embodiments of the invention. The same stages may occur with the capillary duct of FIG. 1 when it has a pump coupled thereto. In FIG. 7A the first layer 508 is loaded with the biological sample 518. In the described example, of preparing the sample for vitrification, the first layer may be of a holding medium. Then, in FIG. 7B, a second layer 506 is loaded as well. Layer 506 in the example is of a holding solution whose density is higher than this of the holding medium and hence layer 508 is "pushed up" thereby and layer 506 appears bellow. It is advised to avoid shaking the straw, or the layers may mix. In addition, the biological sample gradually absorbs the holding solution, which replaces the holding medium that has been there before. This turns the sample heavier and therefore it sinks from layer 508 to layer 506. Thereafter, because there are other, unloaded solutions in the series, the process repeats itself and layer 504 is loaded, as illustrated by FIG. 7C. Layer 504 may be of equilibrium solution. It is heavier than the holding solution of layer 506, and therefore layers 506 and 508 are pushed up, layer 504 resides therebelow, and sample 518, which absorbs the equilibrium solution, further sinks to layer 504. Finally, a forth solution (such as a vitrification solution) in the present example is loaded to yield FIG. 5, wherein layer 502 comprises the fourth, heaviest solution and biological sample 518 what sank again. The forth solution may be another equilibrium solution, heavier than this of layer 504.

It is noted that the description above does not intend to teach how to perform vitrification. Rather it is intended at teaching how to use the straw in order to prepare the sample for vitrification. Therefore, the procedure described does not intend to be an accurate vitrification procedure. Further to reading the procedure described herein, a person versed in the art of vitrification will be able to apply the procedure to a known per se vitrification process.

Further to understanding the embodiments presented so far, additional embodiments are presented, which require neither capillarity nor the usage of a pump. The concept of communicating vessels is a known concept since ancient times. When a tube, open at both ends, is immersed in a container with a liquid, the liquid would fill the tube to a level similar to the level of the liquid in the container.

FIG. 8 illustrates loading four solutions into a straw, according to embodiments of the invention. In FIG. 8 a straw 800 is immersed in a first solution within a container 802 in order to load a biological sample 804. Straw 800 is coupled to a perforated member in its distal end. The level of the solution in container 802 is marked by 806. If the procedure is, e.g., preparation of a biological sample for vitrification, the first solution may be a holding medium in which the biological sample resides. In order to load the sample into the straw, a pump can be coupled to the proximal end thereof, and possibly disconnected after the loading. The pump, which is not illustrated in FIG. 8 though it can be seen, for example, in FIG. 1 (see 112), can be, e.g., an electrical pump or a manual pump such as a bulb.

As can be seen in the figure, inside straw 800 there is obtained a layer 808 of the first solution, whose level is similar to the level of the solution in the container. Thereafter, the straw can be transferred to a second container 810, holding a second solution, heavier than the first solution, whose level in the container, marked as 812, is higher than level 806 of the first solution in container 802. In response, the lighter layer 808 would be pushed up so as to equalize level with the liquid level 812, wherein a new layer 814, of the second solution, would reside therebelow. In addition, it is illustrated in the figure that biological sample 814 would sink from layer 808 to layer 814, as was previously explained with reference to FIGS. 7A, 7B and 7C. Therefore, biological sample 814 is being treated by the second solution in the straw space.

It is noted that upon transferring straw 800 from container 802 to container 810, layer 808 of the first solution should be kept inside. If the straw is narrow enough to maintain capillarity, the layer will be kept inside. However, if the straw does not maintain capillarity, it may be required to seal its proximal end during the transfer, thus preventing loss of layer 808. This is relevant to any transfer of the straw between one container to another.

Further on, straw 800 is transferred to container 816, holding an even heavier third solution, whose level 818 is higher than level 812 of the second solution in container 810. Again, the two previous layers (808 and 814) are pushed up by the third solution to equalize the level inside the straw to level 818 of the third solution. Thus, layer 820 of the third solution is created below layers 808 and 814, while sample 804 sinks thereto. Therefore, biological sample 814 is being treated by the third solution in the straw space.

Finally in the present example, straw 800 is transferred to container 822, holding a fourth, heaviest solution, whose level in the container, marked as 824, is higher than level 818 of the third solution in container 816. In response, layers 808, 814 and 820 are pushed up by the fourth solution to equalize the level inside straw 800 to level 824 of the fourth solution. Thus, layer 826 of the fourth solution is created below layers 808, 814 and 820, while sample 804 further sinks thereto. Therefore, biological sample 814 is being treated by the fourth solution in the straw space.

At this stage the reader should understand that the invention is not limited to four layers of four solutions. The number of layers and solutions may vary as required, and it can be one layer and solution, two layers and solutions, three layers and solutions, four layers and solutions, five layers and solutions, six layers and solutions, seven layers and solutions, eight layers and solutions, nine layers and solutions, ten layers and solutions, or any other number of layers and solutions applicable to the case. Generally, the device is configured to treat the biological sample with a series of solutions whose density increases gradually.

In addition, in the figure, containers 802, 810, 816 and 822 are resembling. However, this is non-mandatory as well. Due to the communicating vessels concept, the level of liquid in the straw would become the same as the level of liquid in the container where it is immersed, regardless of the shape and volume of the containers.

Moreover, while in the example the level of the solution in the containers gets higher as the process advances, it should be understood that this is non-mandatory as well. Instead, it is possible to keep the level constant or even lower it, as long as the straw is immersed deeper and deeper in the solution. Hence, generally speaking, any manipulation allowing rise of the level of solution in the straw space in accordance with the communicating vessels concept may be applied, including combinations (e.g., for the second layer increase the volume, for the third layer immerse deeper, etc., as applicable to the case).

Further to understanding how the communicating vessels concept can be applied by some embodiments of the invention, other embodiments are presented: In these embodiments it is possible to fill the straw space with a layer of solution, then closing the proximal end of the straw space. Next, if the straw is transferred to another solution (or if the solution in the container changes to another solution), it should be appreciated that the composition of the solution in the layer, or at least in its bottom, near the distal end, will gradually change by diffusion.

While embodiments presented so far referred to gradually increasing densities, it should be appreciated that this is not always the case and sometimes the densities may be gradually decreased instead of increased. One such example is while warming or thawing a vitrified biological sample. In such an example, there is a need to gradually reduce the concentration of cryoprotectants around and within the sample. In some embodiments, a high concentration of sucrose (e.g., a 1M, 1 Molar sucrose solution) is used to dilute the vitrification solution in the straw space, thereby diluting the vitrification solution. Thereafter the solution is further diluted by a lower concentration sucrose solution, such as 0.5M and so on.

Understanding that sometimes the densities may be decreased rather than increased, it is generally said herein that and further to reviewing the different embodiments of the invention, those involving change of solution (see, e.g., FIG. 4), those involving diffusion of solutions, and those involving layers of solutions (see, e.g., FIGS. 5, 6, 7A-7C and 8), it is generally explained that the biological sample loaded into the straw space is gradually exposed to solutions having gradually changing densities. The perforated element prevents loss of the sample, while it still allows in-flow and out-flow of the solutions therethrough (solutions are kind of liquids).

Although various embodiments of the invention have been described above, these are only given for the purpose of explanation of the present invention and the range of the present invention should not be considered as being limited only to these embodiments.

The invention claimed is:

1. A device configured to perform a cryoprocedure on at least one biological sample, the device comprising:
a straw comprising a straw space configured to draw liquid from a distal end of the straw space towards a proximal end of the straw space, wherein said straw comprises polypropylene; and
a pod coupled to a distal end of the straw by a hugging element, the pod having a perforated surface having at least one orifice having a diameter smaller than a diameter of the at least one biological sample, wherein said pod comprises of polycarbonate, wherein the perforated surface is configured to allow inflow of liquids and outflow of liquids and wherein said perforated surface is positioned perpendicularly to a longitudinal axis of said straw located at said distal end of the straw and wherein said at least one orifice is positioned parallel to said longitudinal axis of said straw in a flow direction; and
a wall delineating a holding space configured to form, together with the straw space, a preparation space wherein the at least one biological sample can undergo the cryoprocedure.

2. The device of claim 1, wherein the at least one orifice has a circular cross section.

3. The device of claim 1, wherein the at least one orifice has a square cross section.

4. The device of claim 1, further comprising: a pump coupled to a proximal end of the straw.

5. The device of claim 1, wherein the straw is a capillary duct, and the straw space is a capillary space for liquid to flow in a capillary action.

6. The device of claim 1, wherein the pod includes a base, and the wall extends proximally from the base.

7. The device of claim 1, wherein a portion of the pod is external of the straw.

8. A pod coupled to a straw by a hugging element, wherein the straw is configured for performing a cryoprocedure on at least one biological sample, and wherein said straw comprises polypropylene and said pod comprises of polycarbonate, the pod comprising:
a holding space within a wall of the pod configured to form, upon coupling with a straw, a preparation space together with a straw space of the straw; and
a perforated surface having at least one orifice whose diameter is smaller than a diameter of the at least one biological sample, wherein the perforated surface is configured to allow inflow of liquids used for the cryoprocedure into the holding space and outflow of liquids from the holding space, and wherein said perforated surface is positioned perpendicularly to a longitudinal axis of said straw located at a distal end of the straw and wherein said at least one orifice is positioned parallel to said longitudinal axis of said straw in a flow direction.

9. The pod of claim 8, wherein the pod includes a base, and the wall extends proximally from the base.

* * * * *